United States Patent [19]

McGee

[11] 4,099,740
[45] Jul. 11, 1978

[54] SPRING-AIR TANDEM SUSPENSION

[75] Inventor: Donald J. McGee, Troy, Mich.

[73] Assignee: H & H Equipment Co., Detroit, Mich.

[21] Appl. No.: 709,868

[22] Filed: Jul. 29, 1976

[51] Int. Cl.² .............................................. B60G 5/02
[52] U.S. Cl. .................................... 280/678; 280/683
[58] Field of Search ............ 280/104.5 A, 111, 112 R, 280/112 A, 104.5 R, 678, 683

[56] References Cited

U.S. PATENT DOCUMENTS

| | | | |
|---|---|---|---|
| 3,014,735 | 12/1961 | Lich | 280/678 |
| 3,224,522 | 12/1965 | Fleming | 280/683 |
| 3,692,325 | 9/1972 | Govirand | 280/678 |

Primary Examiner—Richard A. Bertsch

Attorney, Agent, or Firm—Whittemore, Hulbert & Belknap

[57] ABSTRACT

The suspension, as mounted in duplicate to a truck or trailer frame midway between fore and rear axles of a rear axle pair, is located relatively closely adjacent the rear of said frame; and it utilizes but a single air bag or spring unit, horizontally interposed medially between the axles, yet well spaced forwardly and inwardly from their wheel tires, as a springing agency.

This unit acts vertically between the frame and a horizontal rocker arm assembly of the suspension that is coupled front-to-rear with a pair of generally similar leaf spring sets. The suspension affords an equal loading of the leading and trailing rear axles by a total of only two such air springs, each coacting with a fully floating beam, this beam being slidably associated between said spring sets.

6 Claims, 2 Drawing Figures

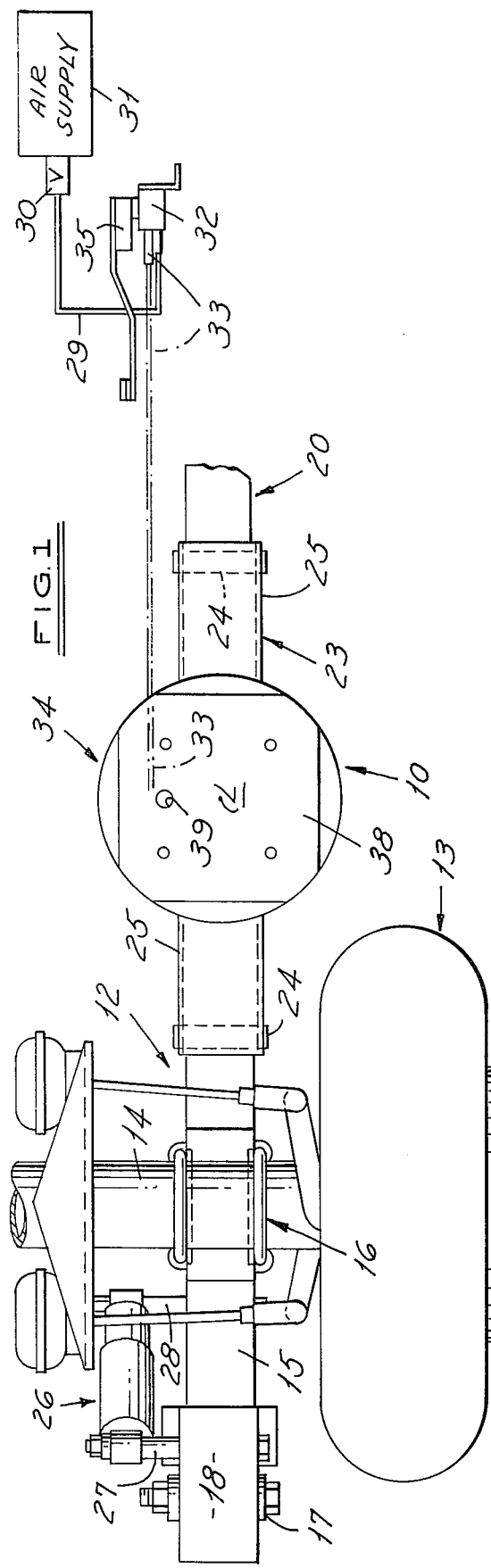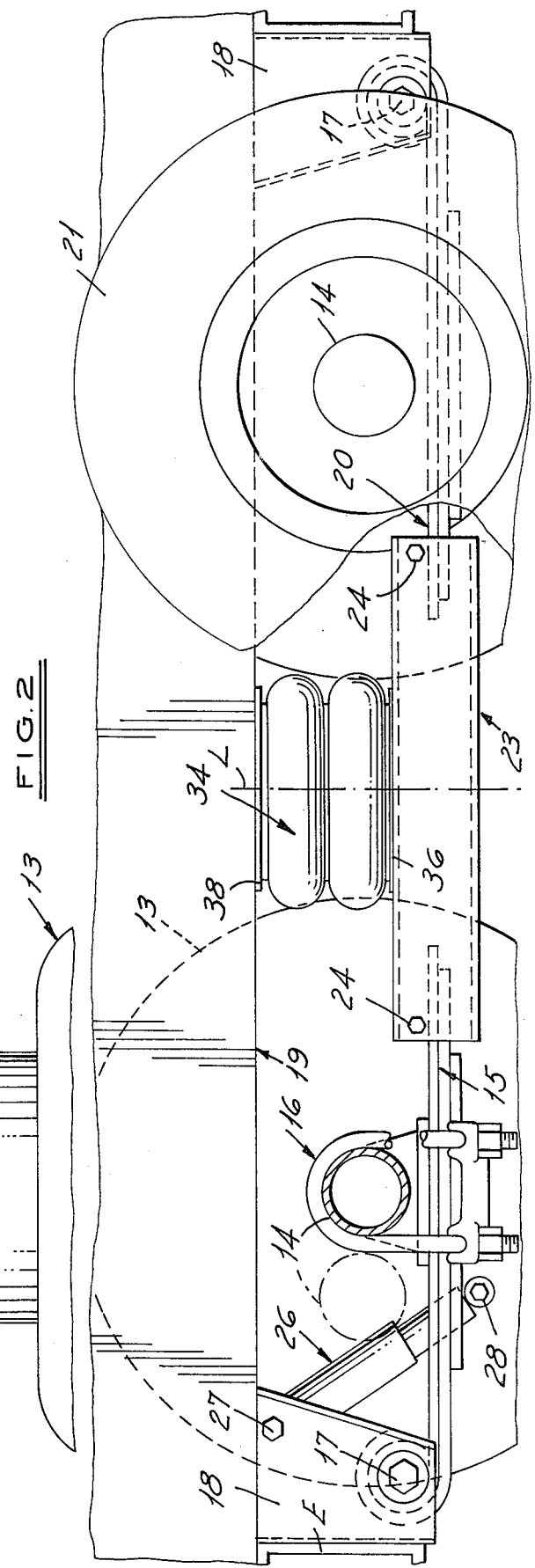

ered by its 4,099,740,

SPRING-AIR TANDEM SUSPENSION

BACKGROUND OF THE INVENTION

1. Field of the Invention

The invention relates in general to the field of truck and trailer frame-supported suspensions for ground wheels which are usually employed in sets of two or four adjacent the rear of the vehicle frame.

2. Description of the Prior Art

My earlier patents, U.S. Pat. No. 2,674,249 of July 4, 1972, U.S. Pat. No. 3,693,964 of Sept. 26, 1972, and U.S. Pat. No. 3,774,934 of Nov. 27, 1973, all relate to heavy duty truck suspension systems or devices; the disclosure of U.S. Pat. No. 3,774,934 is by far the most closely related of the three to the present improvement.

SUMMARY OF THE INVENTION

The suspension's rocker arm assembly mentioned in the Abstract is a pivot-free floating beam which equally distributes the rear vehicle load as between two fore-to-aft spaced axles mounting load wheels disposed either in single or dual pairs transversely of the vehicle center line. Each of the two such beams carries a single conventional, centrally located air spring or bag unit which is directly engaged from above by a side member of the frame. Thus each beam, as slidably coupled at its ends to individual fore and aft leaf spring sets of the respective wheel axles, constitutes a pivot-less floating axle mount which is universally self-compensating, by reason of its bag's flexibility, in any direction at an angle to the horizontal. In short, a single air bag unit is the sole pneumatic springing agency for each half of the rear truck or trailer load.

BRIEF DESCRIPTION OF THE DRAWING

FIG. 1 is a fragmentary top plan view of the improved suspension as operatively associated with a known type of braking unit in combination with which it will in many instances be employed; and FIG. 2 is a fragmentary side elevation of the suspension, being partially broken away to better show a dual leaf spring and floating beam feature; also suggesting in dot-dash line a comparative positional relation of an axle connection of the suspension to a previous more rearward one, shown in dot-dash line.

DESCRIPTION OF A PREFERRED EMBODIMENT

FIGS. 1 and 2 show one of the two like tandem suspension assemblies 10 of the invention as serving in combination with a known air disk brake unit 12, typically a 15 inch size, designated by its manufacturer as Stamco 2100, with which the assembly 10 is preferably combined. However, this design is of course capable of a relatively wide range of alternatives, mechanical, hydraulic and pneumatic, and its use in the present system may be considered to be for the purpose of illustration only.

Brake unit 12 is shown as acting on a dual or tandem wheel tire set 13 whose axle traverses a housing 14 that is mounted downwardly onto a trailing leaf spring set 15 of suspension 10. The mount involves an adjustable inverted yoke and plate sub-assembly 16, which is preferably as illustrated and described in my above-identified U.S. Pat. No. 3,674,249, although alternative mounts are again contemplated. Likewise as appears in the same patent, the spring set 15 may have a rubber-bushed connection at 17 to a rearmost rigid bracket 18 welded on the vehicle frame side member 19. The arrangements between the suspension 10 at its opposite or leading leaf spring stack sub-assembly, specially designated 20, and the forward tandem wheel tire set 21 of the vehicle, are essentially the same as at the rear leaf set 15.

Furthermore, each of said leaf sub-assemblies has, adjacent the respective mutually facing or inner ends thereof, a slidably floating connection with an elongated rigid channel-like rocker beam 23 of the suspension assembly. This connection is minimally suggessted in my above-noted U.S. Pat. No. 3,693,964, but its dual presence in a setting such as the present one is, of course, new and unique.

Headed cross pins or rivets 24 extending across beam 23 adjacent its opposite ends serve to limit positively the vertical throw of beam 23, without interfering with a free end-wise slide relative to the leaf spring units. More importantly, the cross pieces 24 act as front and rear pivots of beam 23 about which it rocks in action.

A single hydraulic or pneumatic shock absorber 26 acts between pivot connections to a fixed lateral anchor stud 27 on frame bracket 18 and a transverse stud 28 welded to and beneath the leaf spring pack unit 15, per my U.S. Pat. No. 3,674,249.

With reference to FIG. 1, it is seen that a pneumatic line 29 and its connected protection valve 30 extend between pressurized air supply source 31 and a leveling valve 32 fixed on a frame angle iron. This valve, as connected by a tubular conduit 33 to a standard air bag 34 of suspension 10, maintains the latter in proper pressure balance, the valve 32 being conventionally controlled by an "on-off" type switch 35.

While important in the intended functioning of the subject suspension, none of the aforementioned individual features is of itself of controlling significance in the present invention, which essentially relates to certain improved positional relationships leading to the advantages alluded to in the Abstract and the Summary.

The air cushion unit 34 is centered midway of the length of beam 23, being fixedly equipped at its bottom with a circular anti-wear plate 36 bearing on said beam; and at its top (where it acts upwardly on a side stringer member 37 of the truck frame) has a second similar plate 38 equipped with four studs for attachment to frame 19. This plate, as appears in FIG. 1, also has an opening 39 to which an end of the air line 33 from leveling valve 32 is sealingly connected. Thus the pneumatic cushion 34 is at all times properly inflated for a firm but universally yieldable vertical floating action between frame member 37 and rocker beam 23.

The longitudinally centralized location of air cushion 34 on the beam insures equal loading of the fore and aft axles 14; moreover, it enables a shift of the effective vertical suspension line L of the pneumatic and mechanical spring set 34–23 well forward of the previous conventional theoretical line of rear air spring action. This in turn has the important advantage, in view of the desirability of minimizing longitudinal dimensions, of bringing the entire suspension effect decidedly forwardly of the rear frame extremity E (FIG. 2).

FIG. 2 depicts this by cmparison with the prior shackled connection to the rearmost axle 14, as shown in dot-dash line. The cushion 34 is also located well out of the longitudinal and lateral space (FIG. 2) impinged by the tires 13 and 21. Thus a wider diameter air cushion design is possible. Yet only two air-leaf spring subassemblies are needed, one adjacent each side of the payload space.

The full-floating rocker beam concept dispenses with mechanical or other equivalent connections to the frame, over and above the usual accepted shock absorber. A fixed beam pivot is also absent; and features such as these contribute to a minimized cost of manufacture, installation and maintenance of the system as a whole.

What is claimed is:

1. An improvement in a heavy duty vehicle characterized by a pair of fore and aft-spaced wheel axles mounted on a vehicle frame and each equipped with a mechanical springing device; said improvement comprising a single mechanical floating beam disposed in front-to-rear alignment with and between said fore and aft springing devices, being operatively connected adjacent its opposite ends to said springing devices, and a single fluid-pressure cushion unit verticallly interposed between said beam and a part of said frame, said cushion unit being located substantially equidistant from said operative end connections of the beam to said fore and aft springing devices respectively and being in a substantially horizontally equally spaced relation to said connections.

2. The improvement of claim 1, in which said fore and aft springing devices are each leaf spring sets at least one of which has a mechanical pivot connection on said vehicle frame.

3. The improvement of claim 2, and further comprising a shock absorber unit pivot-connected at opposite ends thereof to said frame and to a leaf spring set.

4. The improvement of claim 3 in which the leaf spring set and floating beam have a freely slidable front-rear relationship adjacent said opposite end connections.

5. The improvement of claim 2 in which the leaf spring set and floating beam have a freely slidable front-rear relatinship adjacent said opposite end connections.

6. The improvement according to claim 2 in which each of said fore and aft leaf spring sets has a mechanical pivot connection on said vehicle frame and said operative connections between said floating beam and said leaf spring sets comprise cross pins adjacent the respective opposite ends of said beam above the adjacent ends of said leaf spring sets serving to limit the vertical throw of the beam while permitting free endwise slide thereof and forming front and rear pivots about which said beam rocks in action.

* * * * *